United States Patent [19]

Holden et al.

[11] Patent Number: 5,260,625
[45] Date of Patent: Nov. 9, 1993

[54] COLOR SEQUENTIAL ILLUMINATION SYSTEM

[75] Inventors: John G. Holden, Hemel Hempstead; Ian A. Shanks, Penn; Andrew N. Carrington, Hemel Hempstead, all of England

[73] Assignee: Thorn EMI plc, London, England

[21] Appl. No.: 774,315

[22] Filed: Oct. 10, 1991

[30] Foreign Application Priority Data

Oct. 15, 1990 [GB] United Kingdom ............ 9022345

[51] Int. Cl.$^5$ ............................................ H01J 61/42
[52] U.S. Cl. ................................... 313/486; 313/487; 313/504; 313/493; 313/501; 359/48; 359/50; 362/260
[58] Field of Search .............. 313/486, 487, 504, 493, 313/497, 635, 501; 359/48, 50; 362/260

[56] References Cited

U.S. PATENT DOCUMENTS

| 4,001,628 | 1/1977 | Ryan ........................ 313/487 |
| 4,099,090 | 7/1978 | Corth et al. ................ 313/487 |
| 4,469,980 | 9/1984 | Johnson . | |
| 4,870,484 | 9/1989 | Sonehara ................... 359/50 |
| 5,143,438 | 9/1992 | Giddens et al. .............. 313/486 |

FOREIGN PATENT DOCUMENTS

| 4425685 | 6/1985 | Australia . |
| 2578954 | 9/1986 | France . |
| 1574619 | 9/1980 | United Kingdom . |
| 2198867 | 6/1988 | United Kingdom . |

Primary Examiner—Donald J. Yusko
Assistant Examiner—N. D. Patel
Attorney, Agent, or Firm—Keck, Mahin & Cate

[57] ABSTRACT

A color sequential illumination system, such as, for example, a backlighting system for a liquid crystal display (LCD), comprises lamps for emitting blue, red and green light. The red and green light is provided by lamps including fluorescent dyes having optical decay times similar to a phosphor material used to provide the blue light. In this manner, the blue, red and green emissions can be fully synchronized with electrical signals used to energise the lamps, enhancing color range and color quality. Furthermore, if the fluorescent dyes are carried in plastics materials, then trapping and concentration of the light generated may also be achieved, providing enhanced brightness for the LCD for a given power input.

8 Claims, 2 Drawing Sheets

COLOR SEQUENTIAL ILLUMINATION SYSTEM

BACKGROUND OF THE INVENTION

The present invention relates to colour sequential illumination systems and has particular, though not exclusive relevance to such systems as applied to liquid crystal displays.

Colour sequential illumination systems are known which, for example, are utilised for the backlighting of liquid crystal displays. In such applications, the systems provide electronically controlled sequential pulses of light of the three primary colours which are integrated to provide a broad spectrum of perceived coulours when viewed by an observer.

The light sources in such systems are usually low pressure mercury/rare gas discharge lamps coated on the inside wall with a phosphor (an example of such a type of lamp is the conventional fluorescent lamp). The lamps are switched by a high frequency ($>10$ kHz) supply and, hence, the rise and decay times of the phosphors used in the lamps have a profound effect on the colour quality of the light source. For example, if the green phosphor has a relatively long decay time then green light emission will continue for a signicant time after the green lamp has been switched off. Such continuing emissions after deenergisation degrade the colour quality of the subsequent emissions (containing only red and/or blue light) occurring after the extinction of the green lamp because light emission will no longer be synchronised with the pulses used to generate each colour. As a result the range and purity of colours which may be produced by such systems will be impaired.

The phosphors used in red and green lamps typically possess relatively long optical decay times for example, 0.59 ms and 0.78 ms respectively, as compared with that of a blue phosphor which, typically, is around 0.04 ms.

SUMMARY OF THE INVENTION

It is thus an object of the present invention to at least alleviate the aforementioned problems by providing a colour sequential illumination system in which the optical decay times for each separately coloured lamp is substantially the same, hence enabling the light emitted to be fully synchronised with the electrical signals applied to the lamps in order to generate this light.

Thus, according to the present invention there is provided a colour sequential illumination system comprising a plurality of illumination means, at least one of which comprises organic fluorescent material possessing a respective colour characteristic and optical decay time, the optical decay time for the or each organic fluorescent material being of substantially less duration than the optical decay time of a phosphor material possessing a corresponding colour characteristic. Thus, by employing organic fluorescent materials in the illumination means which have the property of relatively faster optical rise and decay times as compared with phosphors providing the same colour characteristic and further arranging that the optical decay times to produce each colour are substantially the same, unwanted colour mixing is reduced enabling an enhanced colour range and purity of colour to be achieved.

Preferably, the organic fluorescent material comprises a dye. By utilising a dye, the emissions are restricted to a narrow band of wavelengths and include a red emission and a green emission both with spectral characteristics which at least match those of red and green emitting powder phosphors.

Preferably, the organic fluorescent material comprises a plastics material. Thus by incorporating the organic fluorescent material in a polymer matrix of plastics material, any suitable form of construction may be adopted, for example a thin layer, or an envelope around a discharge tube.

BRIEF DESCRIPTION OF THE DRAWINGS

The invention will now be described, by way of example only, with reference to the accompanying drawings, of which.

DESCRIPTION OF THE PREFERRED EMBODIMENT

Figure 1:
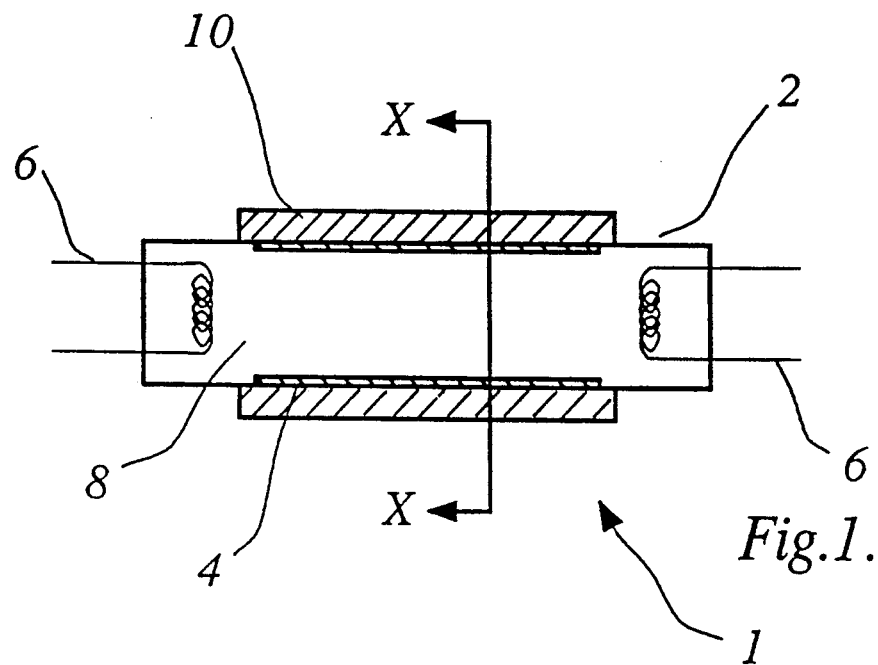
FIG. 1 shows a schematic representation of one embodiment of a lamp for use in a colour sequential illumination system in accordance with the present invention.
Figure 2:
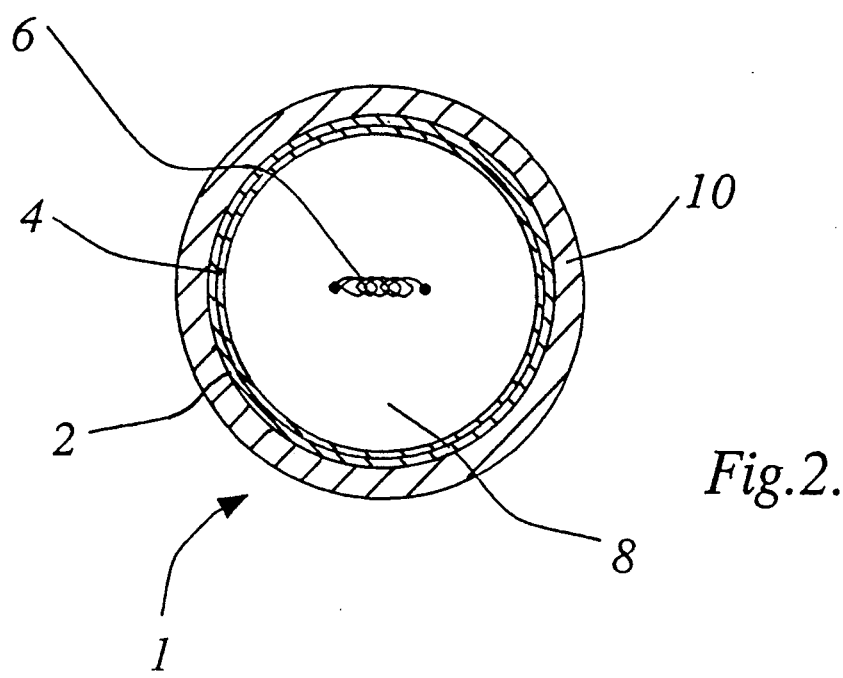
FIG. 2 shows a section through the line X—X of FIG. 1.

Referring to FIG. 1, an illumination means such as a discharge lamp or the like is shown generally as 1. The illumination means comprises a glass envelope 2, the inside surface of which is coated with a blue phosphor material 4 in the form of a powder. The ends of the envelope 2 are sealed and contain electrodes 6 for exciting a discharge, for example an ultra-violet discharge, within a gas 8 contained within the glass envelope 2.

Around the outside of the glass envelope 2 is a dye-doped organic fluorescent material 10 in the form of a plastics material.

In operation of the illumination means 1, the discharge in the gas 8 causes generation of light within the glass envelope 2. This causes the blue phosphor powder 4 to emit blue light which in turn stimulates fluorescence within the fluorescent plastics material 10, which is chosen so as to have a colour characteristic of a suitable wavelength, for example green or red.

Because the optical decay time of the organic fluorescent material 10 is substantially equivalent to that of the blue phosphor powder 4 (approximately 0.04 ms), the light emissions of both colours will no longer occur for a significant time after the illumination means 1 has been switched off. Furthermore, since the decay times of blue, green and red light can be arranged to be substantially equal, the light emitted from a colour sequential illumination system can be fully synchronised with the electrical signals used to control energisation of the lamps and a reduction in unwanted colour mixing will result. The plastics material and the fluorescent dyes used to produce the organic fluorescent material 10 can degrade with prolonged exposure to relatively high levels of ultra-violet radiation, such as those arising from the discharge excited in the envelope 2. However, because the envelope 2 is constructed from glass, there is no need to filter out ultra-violet radiation as glass is a good absorber of such radiation.

Figure 3:
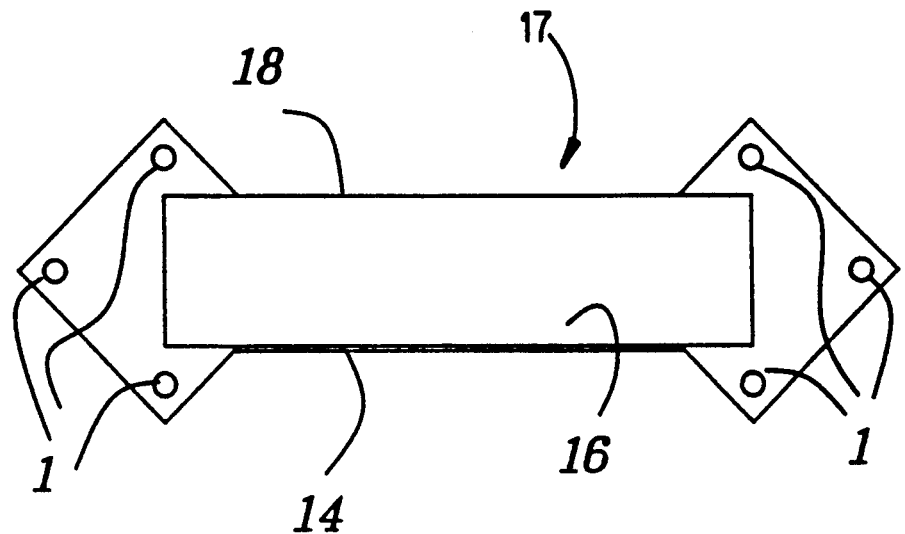
FIG. 3 shows a schematic representation of a colour sequential illumination system according to the present invention.

The light concentrating properties of fluorescent materials, which result from the total internal reflection at the material/air interface, may be employed to advantage within a colour sequential illumination system for a backlit display. As shown in FIG. 3, the illumination means 1 which incorporate the organic fluorescent materials are arranged to introduce light from the edges of the backlight display unit 17. The near face 16 of the unit 17 is coated with a reflective layer 14 so that the light introduced thereto is emitted via front face 18.

Figure 4:
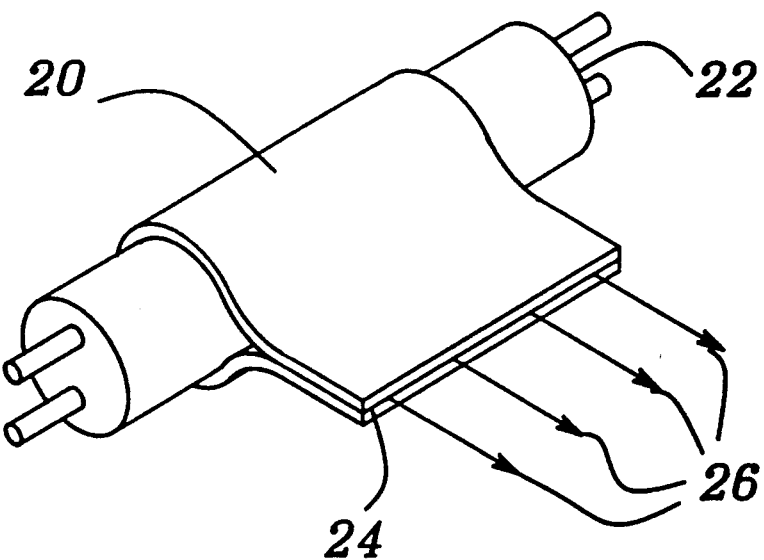
FIG. 4 shows a schematic representation of a further embodiment of a lamp for use in the present invention.

A modification of the above is shown in FIG. 4 in which a sheet of fluorescent material 20 is wrapped around a blue emitting fluorescent tube 22. Much of the light generated within the fluorescent material 20 is guided by total internal reflection to edges 24 of the sheet, from where it will emerge as an intense strip-like beam of light, depicted as 26 in FIG. 4. By silvering all edges of the sheet 20, apart from edges 24, the majority of the light generated within the fluorescent sheet 20 may be directed as required, for example to backlight a liquid crystal display. Both green and red light may be introduced into a backlight in this way with blue light being supplied directly by the blue emitting fluorescent tube 22 without the need for a sheet of 'blue emitting' fluorescent material 20 wrapped therearound because of the relatively short optical decay time of the blue emitting phosphors used in the tube 22.

Hence the present invention provides a colour sequential illumination system in which the optical decay times of the constituent light emitters are substantially equal and, furthermore, which are substantially less than the optical decay times of similar colour phosphor light emitters. Additionally, by constructing the illumination means from organic fluorescent plastics material, light trapping and, therefore, concentration of the light output may be achieved which is particularly advantageous in liquid crystal displays as the display brightness can be considerably improved.

It will be appreciated that alternative embodiments to those hereinbefore described may equally well be employed whilst still remaining within the scope of the present invention. For example, the organic fluorescent materials need not be materials emitting only red and green; any suitable colour exhibiting the requisite decay times may be employed. Furthermore, any suitable optical pump may be employed, not necessarily blue fluorescent light.

We claim:

1. A colour sequential illumination system comprising:
   a plurality of illumination means for generating light of respective colour characteristics;
   each illumination means including a phosphor for producing light by excitation thereof;
   at least one illumination means further including organic fluorescent material for receiving light emitted by the phosphor and emitting in response light having a respective colour characteristic, the or each organic fluorescent material having an optical decay time which is of substantially less duration than the optical decay time of a phosphor material possessing a corresponding colour characteristic, whereby all illumination means of the plurality have substantially equal optical decay times.

2. A system according to claim 1 wherein the organic fluorescent material comprises a dye.

3. A system according to claim 1 wherein the organic fluorescent material comprises a plastics material.

4. A system according to claim 1 wherein the illumination means includes a gas discharge tube.

5. A system according to claim 1 wherein the illumination means includes an arc lamp.

6. A system according to claim 1 wherein the colour characteristic is red.

7. A system according to claim 1 wherein the colour characteristic is green.

8. A system according to claim 1 wherein the optical decay time is less than 0.1 milliseconds.

* * * * *